US011064024B1

(12) United States Patent
Nishida

(10) Patent No.: US 11,064,024 B1
(45) Date of Patent: Jul. 13, 2021

(54) ENCODING/DECODING STRUCTURE AND DISTRIBUTED DATA SYSTEM USING THE SAME

(71) Applicant: ASJ INC., Kawaguchi (JP)

(72) Inventor: Hiroshi Nishida, Kawaguchi (JP)

(73) Assignee: ASJ INC., Kawaguchi (JP)

(*) Notice: Subject to any disclaimer, the term of this patent is extended or adjusted under 35 U.S.C. 154(b) by 631 days.

(21) Appl. No.: 15/778,808

(22) PCT Filed: Nov. 10, 2017

(86) PCT No.: PCT/JP2017/040667
§ 371 (c)(1),
(2) Date: May 24, 2018

(87) PCT Pub. No.: WO2019/008792
PCT Pub. Date: Jan. 10, 2019

(30) Foreign Application Priority Data

Jul. 7, 2017 (WO) .................. PCT/JP2017/024984

(51) Int. Cl.
*H04L 29/08* (2006.01)

(52) U.S. Cl.
CPC ............ *H04L 67/108* (2013.01); *H04L 67/06* (2013.01); *H04L 67/1095* (2013.01)

(58) Field of Classification Search
CPC ... H04L 67/06; H04L 67/108; H04L 67/1095; H04L 67/1097; H04L 1/0041;
(Continued)

(56) References Cited

U.S. PATENT DOCUMENTS

2008/0154928 A1* 6/2008 Bashyam ................ H03M 7/30
2011/0019769 A1* 1/2011 Shokrollahi .......... H04L 1/0041
375/296
(Continued)

FOREIGN PATENT DOCUMENTS

JP 2004-159042 A 6/2004
JP 2012-221419 A 11/2012
(Continued)

OTHER PUBLICATIONS

International Search Report dated Dec. 12, 2017, Issued in Counterpart of International Application No. PCT/JP2017/040667 (2 pages).
(Continued)

*Primary Examiner* — Le H Luu
(74) *Attorney, Agent, or Firm* — Westerman, Hattori, Daniels & Adrian, LLP

(57) ABSTRACT

A distributed data system divides an original file into N different block files and distributes the block files to a number of servers of N or more in a distributed manner. The distributed data system includes an encoding unit configured to separate the original file into pieces of data at the same interval, separate the separated pieces of data into N pieces again, respectively multiply the N pieces of data which are separated again by coefficients corresponding to servers to which the pieces of data are to be distributed, and total the values to compress data into one piece of data, and a decoding unit configured to acquire a linear equation for collecting and decoding encoded data from the selected N servers, and obtaining the N block files from the respective servers.

6 Claims, 6 Drawing Sheets

(58) Field of Classification Search
CPC ............ H04L 63/0428; G06F 11/1088; G11B 27/105; H03M 13/033; H03M 13/13; H03M 13/1515; H03M 7/30; H04N 21/858; H04W 72/1236
See application file for complete search history.

(56) References Cited

U.S. PATENT DOCUMENTS

| | | | | |
|---|---|---|---|---|
| 2011/0164562 | A1* | 7/2011 | Qiu | H04W 72/1236 370/328 |
| 2012/0023362 | A1* | 1/2012 | Kadhe | G06F 11/1088 714/6.3 |
| 2013/0282794 | A1* | 10/2013 | Ando | G11B 27/105 709/203 |
| 2014/0317222 | A1* | 10/2014 | Li | H03M 13/033 709/213 |
| 2014/0325213 | A1* | 10/2014 | Carlson | H04L 63/0428 713/165 |
| 2016/0006463 | A1* | 1/2016 | Li | H03M 13/1515 714/766 |
| 2016/0359934 | A1* | 12/2016 | Aerts | H04N 21/858 |
| 2017/0179979 | A1* | 6/2017 | Hussain | H03M 13/13 |
| 2017/0272209 | A1* | 9/2017 | Yanovsky | H04L 67/1097 |

FOREIGN PATENT DOCUMENTS

| | | |
|---|---|---|
| JP | 2014-235425 A | 12/2014 |
| JP | 2015-35182 A | 2/2015 |
| JP | 2017-91307 A | 5/2017 |
| NO | 2013/080290 A1 | 6/2013 |
| NO | 2014/192957 A1 | 12/2014 |

OTHER PUBLICATIONS

Written Opinion of the International Searching Authority (Form PCT/ISA/237) dated Dec. 12, 2017, issued in counterpart International Application No. PCT/JP2017/040667 (Partial Translation), (3 pages).

* cited by examiner

ENCODING/DECODING STRUCTURE AND DISTRIBUTED DATA SYSTEM USING THE SAME

BACKGROUND OF THE INVENTION

Field of the Invention

The present invention relates to an encoding/decoding structure which enables an original file to be remanufactured using a predetermined number of arbitrary servers even if one of a plurality of data management servers fails, and a distributed data system using the encoding/decoding structure.

Description of the Related Art

Conventionally, a data system which uses random network coding having robustness in data protection and high efficiency in data storage capacity is a technique which is difficult to be put to practical use because of difficulty in accessing encoded data.

For example, a distributed data system disclosed in Japanese Unexamined Patent Application Publication No. 2015-35182 is an invention for, in the case where a data management server which constitutes a cluster fails, or the like, detecting data missing and specifying a range of a hash value of a key of the missing data, and a missing data specifying apparatus provided in the distributed data system generates dummy data which becomes a pair with each data management server which stores the data and stores the dummy data in each data management server via a sorting server. When the missing data specifying apparatus receives a notification of change of distributed hash information which manages increase/decrease of the data management servers, the missing data specifying apparatus compares distributed hash information between before and after the change, and determines increase/decrease of the data management servers. In the case where a data management server is deleted, the missing data specifying apparatus transmits a request for deleting dummy data to the data management server via the sorting server, detects missing of data by the registered dummy data being not able to be deleted, and specifies a range of a key of the missing data on the basis of the distributed hash information before change.

By this means, in the case where a plurality of data management servers which constitute a cluster fail, or the like, it is possible to detect missing of data due to loss of original data and a predetermined number of pieces of replicated data. Further, by the missing data specifying apparatus storing distributed hash information of older generation, it is possible to specify a range of a hash value of a key of missing data on the basis of a range covered by the data management server which cannot be used.

In the above-described configuration, in the case where a data management server fails, it is necessary to spend much time in restoring missing of data, and it is necessary to decode the whole data using a plurality of management servers having predetermined original data or replicated data satisfying given conditions as in the related art to perform decoding using the restored data.

As a distributed data processing system for large-scale data, for example, in conventional Hadoop, a configuration (see FIG. 9) is known in which one original file X0 is separated into a plurality of (N) (in the illustrated example, three of X1, X2 and X3) blocks, and replications of each block are distributed to a plurality of servers S1, S2, S3, . . . .

Then, in one cluster, if R servers cannot be accessed, data storage capacity of 1+R times is required.

This similarly occurs in a case of conventional GlusterFS which distributes replications of the original file as is to the servers, and storage capacity of 1+R times is required.

CITATION LIST

Patent Literature

[Patent Literature 1] Japanese Unexamined Patent Application Publication No. 2012-2214192

A problem to be solved by the present invention is to provide, in a distributed data system, a data processing system which can encode and store a file to be distributed to a number of data servers at 1/N of a file volume of the original file and can select arbitrary N servers from the number of servers to remanufacture the original file, and a distributed data system using the data processing system.

SUMMARY OF THE INVENTION

To solve the above-described problem, a data processing system of the present invention in claim 1 is a data processing system in which a client divides an original file into N different block files and distributes the block files to a number of servers of N or more in a distributed manner, the data processing system includes a coefficient determining unit configured to determine N different coefficients associated with N block files as one set for each server, an encoding unit configured to encode the original file to a file of a 1/N size to make a file to be distributed to the servers by separating data of the original file into a number of pieces of data of the same size, separating each separated piece of data into N pieces of a size smaller than the size again, respectively multiplying N pieces of data which are separated again and which constitute N block files by the coefficients of the one set which are associated to obtain N products, and repeating processing of totaling the N products to compress the products into one piece of data, a decoding unit configured to solve a simultaneous linear equation formed with a set of N linear equations using N unknowns to restore the N block files, the simultaneous linear equation being generated by a computer using N files distributed to N servers and the coefficients determined for each of the N servers, and a file connecting unit configured to connect the restored N block files to remanufacture the original file, and the encoding unit connects the servers in a hierarchical manner, encoded data is directly distributed to N servers in an upper most layer in a distributed manner from the client, in servers other than the servers in the upper most layer, the encoded data is distributed to servers in a relatively lower layer from N servers in a relatively upper layer, and all servers except servers in the upper most layer and in a lowermost layer sequentially perform encoding processing at the same time.

Further a distributed data system in claim 4 is a distributed data system in which a client divides an original file into N different block files and distributes the block files to a number of servers of N or more in a distributed manner, the distributed data system includes a coefficient determining unit configured to determine N different coefficients associated with N block files as one set for each server and store the coefficients, an encoding unit configured to encode the original file to a file of a 1/N size to make a file to be distributed to the servers by separating data of the original file into a number of pieces of data of the same size, separating each separated piece of data into N pieces of a size smaller than the size again, respectively multiplying N pieces of data which are separated again and which constitute N block files by the coefficients of the one set which are associated to obtain N products, and repeating processing of totaling the N products to compress the products into one piece of data, a distribution storage unit configured to distribute the encoded data to servers to which the pieces of data are to be distributed and store the encoded data in the servers, a server selecting unit configured to select arbitrary N servers from a number of servers, a decoding unit configured to generate a simultaneous linear equation formed with N linear equations using N unknowns, using N files distributed to the selected N servers and the coefficients determined for each of the N servers, and solve the simultaneous linear equation to restore the N block files, and a file connecting unit configured to connect the restored N block files to remanufacture the original file, the encoding unit connects the servers in a hierarchical manner, encoded data is directly distributed to N servers in an upper most layer from the client in a distributed manner, in servers other than the servers in the upper most layer, encoded data is distributed from N servers in a relatively upper layer to servers in a relatively lower layer, all servers except servers in the upper most layer and in a lowermost layer sequentially perform encoding processing at the same time, and calculation at the encoding unit and the decoding unit is performed using a Galois field (finite field).

The N is preferably 2 or 3.

According to the present invention, an original file is separated into N block files and encoded so that a simultaneous linear equation different for each server can be created.

Because calculation of encoding and decoding is performed using a Galois field arithmetic library, it is possible to realize processing in a short period of time.

In encoding, it is possible to compress the original file into a 1/N size.

Further, in decoding, it is possible to remanufacture an original file by selecting arbitrary N servers and solving N linear equations in a simultaneous manner, and it is only necessary to specify the number of servers for decoding.

DETAILED DESCRIPTION OF THE PREFERRED EMBODIMENT

Embodiment 1

A distributed data system of the present invention is a distributed data system which divides an original file into N different block files and distributes the block files to a number of servers (data management servers) of N or more in a distributed manner, and a distributed data system which can be used in a client-server system.

Further, a data processing apparatus used for encoding and decoding in the distributed data system is the same.

Figure 1:
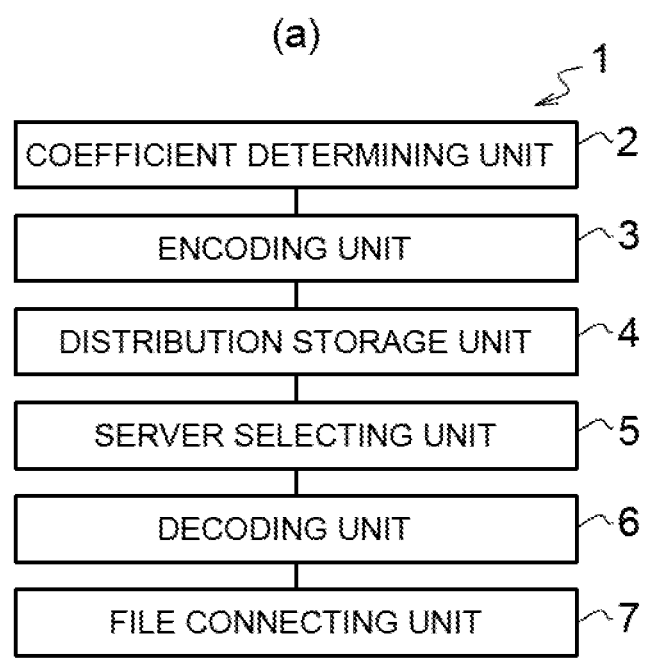
FIG. 1 is a functional block diagram illustrating outline of a distributed data system.
Figure 1:
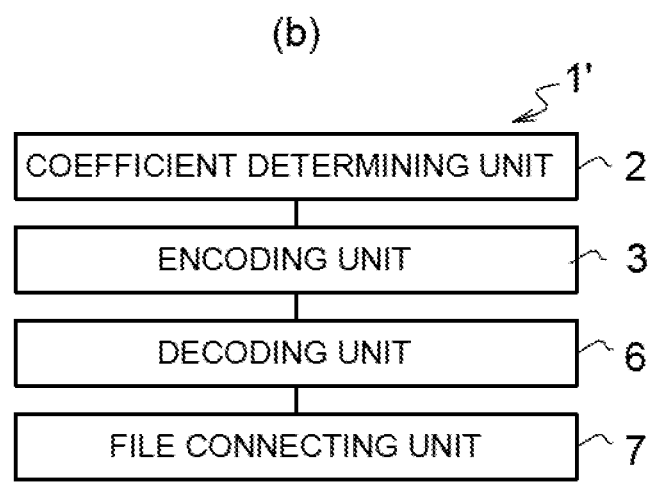

Here, as schematically illustrated in a block diagram in FIG. 1, a distributed data system 1 includes a coefficient determining unit 2 configured to determine N different coefficients associated with N block files for each of servers determined by a client computer C, as one set and store the coefficients, an encoding unit 3 configured to encode an original file X0 into a file of a 1/N size by separating data of the original file X0 into a number of pieces of data of the same size by a client, separating each separated pieces of data into N pieces of data of a same size smaller than the size again, respectively multiplying the N pieces of data which are separated again and which constitute the N block files by the one set of coefficients which are associated to obtain N products, and repeating processing of totaling the N products to compress the products into one piece of data, a distribution storage unit 4 configured to distribute the encoded data to servers to which the data is to be distributed and store the encoded data in the servers, a server selecting unit 5 configured to select arbitrary N servers among a number of servers, a decoding unit 6 configured to generate a simultaneous linear equation formed with N linear equations using N unknowns, using N files distributed to the selected N servers and the coefficients determined for each of the N servers, and solve the simultaneous linear equation to restore the N block files, and a file connecting unit 7 configured to connect the restored N block files to remanufacture the original file X0.

Calculation at the encoding unit 3 and the decoding unit 6 are performed using a Galois field (finite field).

Note that, because a data processing system is configured with the coefficient determining unit 2, the encoding unit 3, the decoding unit 6 and the file connecting unit 7 in FIG. 1, description thereof will be omitted.

[Random Network Coding]

Here, while a specific example will be described assuming that N is 3 for convenience of explanation, in the present invention, N is not limited to 3 and may be 2 or other natural numbers.

In the random network coding, high robustness and saving of data capacity in a data system are both achieved by utilizing characteristics of a simultaneous linear equation.

Therefore, the original file X0 is separated into three blocks (X1, X2, X3), and it is assumed that data constituting X1 is x1, data constituting X2 is x2, and data constituting X3 is x3.

For example, if a number of linear equations are created using combination of the following different coefficients assuming that x1=3, x2=1, and x3=12, $$2x1+5x2+x3=13$$

$$7x1+3x2+8x3=42$$

$$4x1+x2+2x3=19$$

$$5x1+4x2+9x3=33$$

. . . (skip the rest)

here, to obtain X1, X2 and X3 constituting the original file X0, three equations are sufficient among the number of linear equations.

Therefore, in the random network coding, encoding is performed by dividing one original file X0 into N pieces, in the example, three pieces of X1, X2 and X3, and creating three or more linear equations using coefficients a of combination different for each server.

The coefficients are set for each of files (x1, x2, x3) which are files separated into three pieces, for each server.

In this case, the client C first determines three coefficients a for each server to be associated with data X1, X2 and X3 separated into three blocks.

Here, three coefficients which are to be used for one server and which constitute one set may be coefficients which are different from one another or may be coefficients among which two or more coefficients are the same.

However, combination of the same coefficients are not used between different servers, and combination of different coefficients is allocated for each server.

Therefore, ak.1, ak.2, ak.3, $\forall k \in \{1, 2, 3, 4 \ldots\}$, are determined, and data b1, b2, b3, b4, . . . , distributed to each server in a distributed manner are calculated on the basis of expressions of ak.1x1+ak.2x2+ak.3x3 and $\forall k \in \{1, 2, 3, 4, \ldots\}$.

$$a1.1x1+a1.2x2+a1.3x3=b1$$

$$a2.1x1+a2.2x2+a2.3x3=b2$$

$$a3.1x1+a3.2x2+a3.3x3=b3$$

$$a4.1x1+a4.2x2+a4.3x3=b4$$

. . . (skip the rest)

Here, "1" following a is a number indicating a server S1, "0.1" is a number indicating x1 to be stored in the server, and "a1.1" is a coefficient to be used for data of x1 of the server S1.

In a similar manner, "0.2" indicates x2, and "0.3" indicates x3.

"2" following a is a number indicating a server S2, "3" is a number indicating a server S3, and the same applies to others.

Further, b1 is a numerical value constituting a file to be stored in the server S1, b2 is a similar numerical value to be stored in the server S2, and b3 is a similar numerical value to be stored in the server S3.

In this manner, coefficients different for each of the separated files are set in advance for each server.

Here, a size of the coefficients a to be transmitted to each server is 2 bytes and recorded in a header of a file to be distributed to the server.

[Encoding]

The client C distributes the coefficients for each server to the corresponding server along with information such as a file size and time at which the file is updated and, then, starts encoding of the file.

Figure 4:
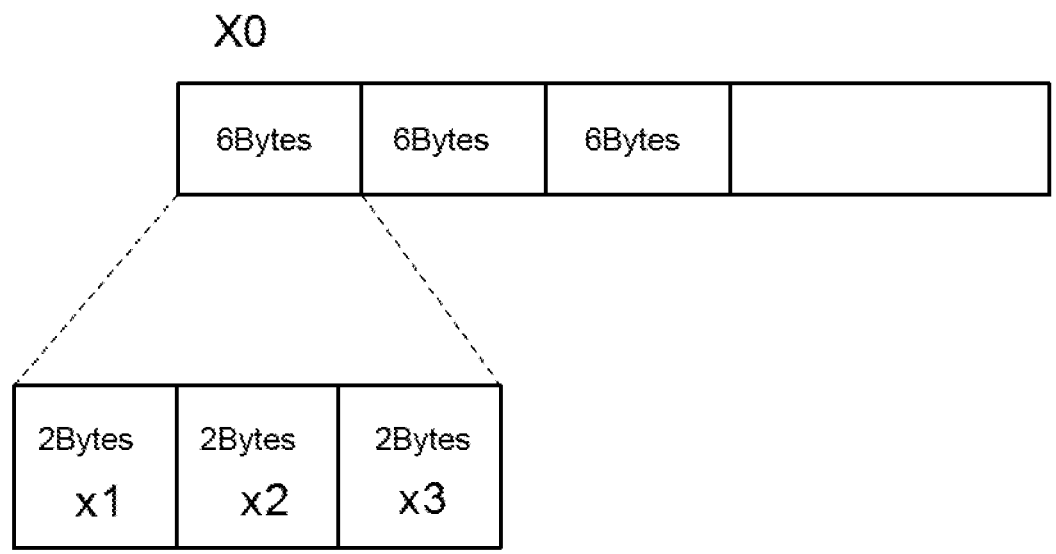
FIG. 4 is a block diagram explaining separation of a file upon encoding.

In encoding, for example, the file is separated for each of 6 bytes, data of the 6 bytes is further separated for each of 2 bytes, and the separated pieces of data are allocated to x1, x2 and x3 corresponding to X1, X2 and X3 (see FIG. 4).

Figure 5:
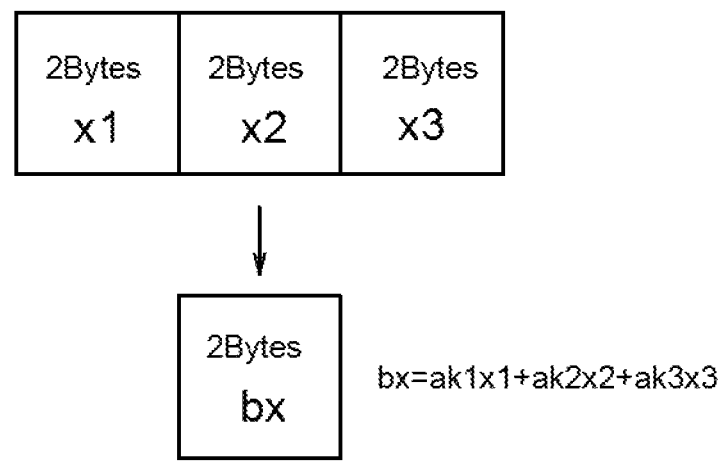
FIG. 5 is a block diagram explaining a compressed state upon encoding.

Then, expressions of ak.1x1+ak.2x2+ak.3x3 and $\forall k \in \{1, 2, 3, 4, \ldots\}$ are calculated using a Galois field, and data bx (see FIG. 5) of 2 bytes which is newly obtained is transmitted to the server corresponding to the coefficients.

The above-described series of work is performed until it reaches an end of the file.

In the present embodiment, while a size of a primary separation is 6 bytes, and a size of a secondary separation is 2 bytes, the above-described numerical values are not particularly limited.

In this manner, a size of the encoded file become ⅓ of a volume of the original file X0.

As mentioned above, because the coefficients, information of the original file as needed, or the like, are added as header information in the file to be stored in the server, a size of a volume of the file to be finally stored in the server becomes slightly larger than ⅓ of the original file X0.

Meanwhile, b1, b2, b3, . . . , obtained through encoding are repeatedly calculated, and transmitted to each server every time b1, b2, b3, . . . , are calculated.

In the case where data obtained through encoding is calculated only at the client C, it requires a lot of processing time for calculation in order to perform distribution for each of all the number of servers S1, S2, . . . .

Therefore, in the present invention, processing of encoding is performed for each hierarchy at the servers connected in a hierarchical manner.

That is, encoded data to be subjected to calculation processing by the client C is subjected to calculation processing and distributed to N servers (in the present example, three of S1, S2 and S3) in the upper most layer.

Data db1 is distributed to the server S1 in the upper most layer little by little in the order that data is encoded, data db2 is distributed to the server S2, and data db3 is sequentially distributed to the server S3.

Here, the encoded data db1, db2 and db3 to be distributed is partial data for each small volume (such as, for example, 7 Mb in a case of data of 10 Gb in total) in the order that the data is subjected to calculation processing, and these pieces of data are sequentially added to make completed data b1, b2 and b3. By partial data in the order that the data is calculated being distributed, it is possible to distribute the data to each of the servers S1, S2 and S3 in a short period of time.

Therefore, the data db1 distributed to the server S1 from the client C is stored in the server S1, and, at the same time, distributed to all the servers S4, S5 and S6 in the second layer from the server S1 and stored in the respective servers.

In a similar manner, the data db2 distributed to the server S2 from the client C is stored in the server S2, and, at the same time, distributed to all the servers S4, S5 and S6 in the second layer from the server S2, and stored in the respective servers.

In a similar manner, the data db3 distributed to the server S3 from the client C is stored in the server S3, and, at the same time, distributed to all the servers S4, S5 and S6 in the second layer from the server S3, and stored in the respective servers.

By this means, in the servers S4, S5 and S6 in the second layer, the data db1, db2 and db3 are distributed from the servers S1, S2 and S3 in the first layer.

Meanwhile, in the servers S4, S5 and S6 in the second layer, the data db1, db2 and db3 are compressed to ⅓ through procedure similar to the encoder using the coefficients set in advance for each server, the server S4 stores the data db4 as the encoded data and creates data b4 in total, the server S5 stores the data db5 as the encoded data and creates data b5 in total, and the server S6 stores the data db6 as the encoded data and creates data b6 in total.

Then, data db4, db5 and db6 stored in the servers S4, S5 and S6 in the second layer are sequentially distributed to servers S7 and S8 in a third layer, and compressed to ⅓ through procedure similar to the encoder, and the server S7 stores the data db7 as the encoded data and creates data b7 in total, and the server S8 stores the data db8 as the encoded data and creates data b8 in total.

In this manner, the data db1, db2 and db3 distributed to the servers S1, S2 and S3 in the upper most layer from the client C are distributed to the servers S4, S5 and S6 in the second layer substantially at the same time or with a slight delay, encoded again and stored in the servers in the second layer, distributed to the servers S7 and S8 in the third layer, and encoded again until servers in a layer immediately before the lowermost layer and the data is stored.

Note that it is only necessary that the number of the servers in the lowermost layer is equal to or smaller than the number of servers in the upper most layer.

In this manner, it is not necessary to calculate encoded data for all the servers (S1 to S8 in the illustrated example) only by the client C, and the client C only has to calculate encoded data for N servers.

Because, among the servers, the encoded data is directly distributed to N servers (S1 to S3) in the upper most layer from the client C in a distributed manner, and in servers (S4 to S6) other than the servers (S1, S2, S3) in the upper most layer and the servers (S7, S8) in the lowermost layer, N servers in a relatively upper layer distribute the encoded data to servers in a relatively lower layer, the servers sequentially perform encoding processing at the same time, so that it is possible to substantially reduce a time period of calculation processing required for encoding.

Figure 2:
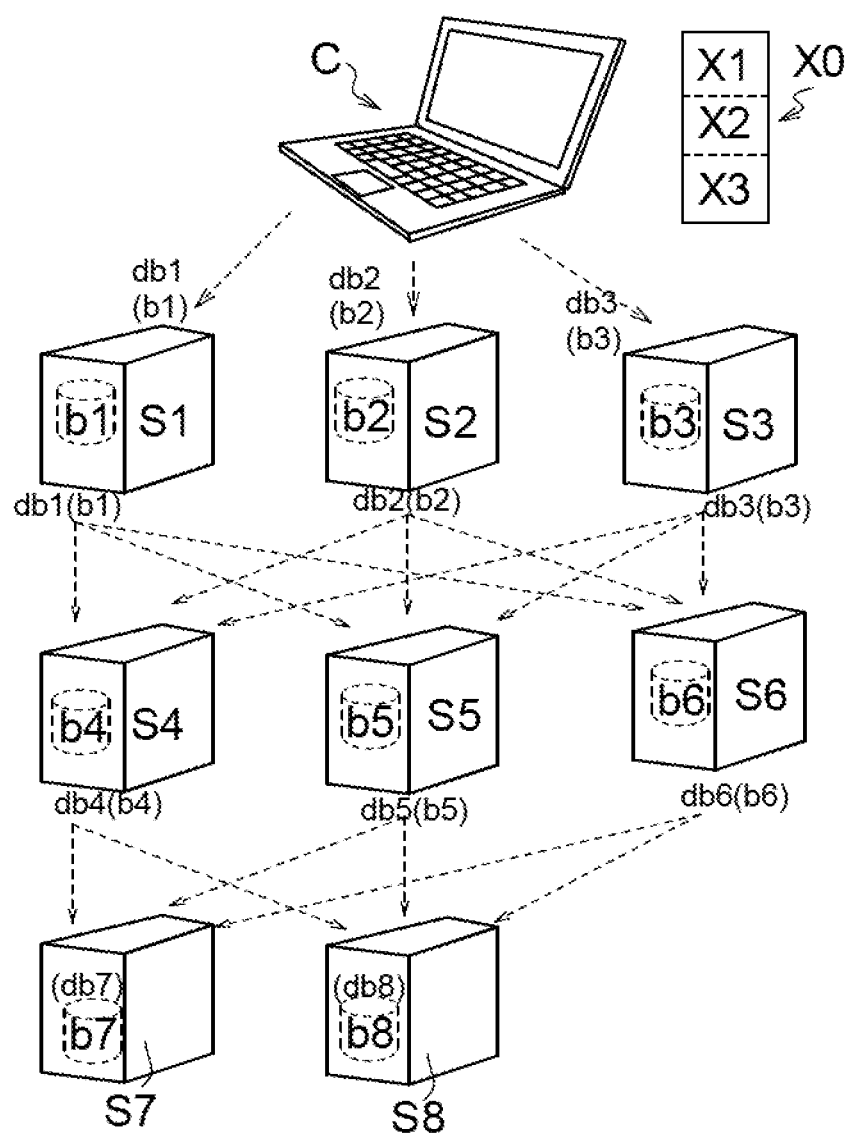
FIG. 2 is a schematic diagram illustrating distribution of encoded data.
Figure 3:
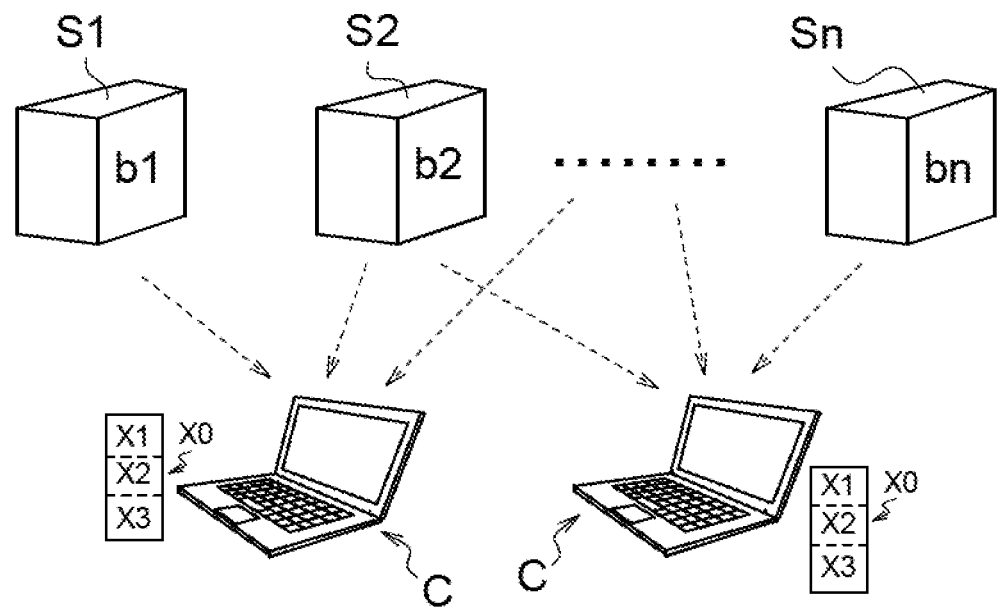
FIG. 3 is a schematic diagram in the case where arbitrary servers are selected to perform decoding.

The encoding (relay encoding) will be further described in detail using an example in FIG. 2.

The client C encodes x1, x2 and x3, which are each 2 bytes to calculate db1(b1), db2(b2) and db3(b3) as mentioned above. For your information, each of db1, db2 and db3 is 2 bytes.

(Here, equation (n) indicates a plurality of organized equations.)

$$a1.1x1+a1.2x2+a1.3x3=b1$$

$$a2.1x1+a2.2x2+a2.3x3=b2$$

$$a3.1x1+a3.2x2+a3.3x3=b3 \quad \text{<Equation (1)>}$$

Then, the client C transmits b1, b2 and b3 respectively to the servers S1, S2 and S3 in the upper most layer (b1 which is formed with accumulation of db1 is transmitted to S1, b2 which is formed with accumulation of db2 is transmitted to S2, and b3 which is formed with accumulation of db3 is transmitted to S3).

The servers S1, S2 and S3 respectively store b1, b2 and b3 and transmit b1, b2 and b3 to three servers of S4, S5 and S6 in the next layer (second layer).

Then, the servers S4, S5 and S6 newly perform encoding as expressed in <equation (2)> on the basis of the respective received b1, b2 and b3.

$$a4.1b1+a4.2b2+a4.3b3=b4$$

$$a5.1b1+a5.2b2+a5.3b3=b5$$

$$a6.1b1+a6.2b2+a6.3b3=b6 \quad \text{<Equation (2)>}$$

The newly calculated b4, b5 and b6 are transmitted to the servers S7 and S8 in the next layer while b4, b5 and b6 are stored. S7 and S8 perform encoding as expressed in the following <equation 3> on the basis of the transmitted b4, b4 and b6 to obtain b7 and b8, and store b7 and b8.

$$a7.1b4+a7.2b5+a7.3b6=b7$$

$$a8.1b4+a8.2b5+a8.3b6=b8 \quad \text{<Equation 3>}$$

The outline of relay encoding of the present example has been described above. Each server (S1, S2, S3) in the upper most layer receives only one piece of data from the client C, stores data without performing encoding and transmits the data to the servers (S4, S5, S6) in the next layer (second layer).

In the next layer, each server respectively receives one piece of data (three pieces of data in the illustrated example) from each server in the upper layer, encodes the data and stores data newly subjected to calculation processing and transmits the data to each server in the lower layer.

Note that if b4, b5, is seen on the basis of the original x1, x2 and x3, and <equation (1)> is substituted in <equation (2)>, the following equation can be obtained.

$$a4.1(a1.1x1+a1.2x2+a1.3x3)+a4.2(a2.1x1+a2.2x2+a2.3x3)+a4.3(a3.1x1+a3.2x2+a3.3x3)=b4$$

$$a5.1(a1.1x1+a1.2x2+a1.3x3)+a5.2(a2.1x1+a2.2x2+a2.3x3)+a5.3(a3.1x1+a3.2x2+a3.3x3)=b5$$

$$a6.1(a1.1x1+a1.2x2+a1.3x3)+a6.2(a2.1x1+a2.2x2+a2.3x3)+a6.3(a3.1x1+a3.2x2+a3.3x3)=b6 \quad \text{<Equation (4)>}$$

If this equation is changed, the following <equation (5)> can be obtained.

$$(a4.1a1.1+a4.2a2.1+a4.3a3.1)x1+(a4.1a1.2+a4.2a2.2+a4.3a3.2)x2+(a4.1a1.3+a4.2a2.3+a4.3a3.3)x3=b4$$

$$(a5.1a1.1+a5.2a2.1+a5.3a3.1)x1+(a5.1a1.2+a5.2a2.2+a5.3a3.2)x2+(a5.1a1.3+a5.2a2.3+a5.3a3.3)x3=b5$$

$$(a6.1a1.1+a6.2a2.1+a6.3a3.1)x1+(a6.1a1.2+a6.2a2.2+a6.3a3.2)x2+(a6.1a1.3+a6.2a2.3+a6.3a3.3)x3=b6$$

If <equation (5)> is made the following <equation (6)>, the following equation can be obtained.

$$a4.1a1.1+a4.2a2.1+a4.3a3.1=\alpha4.1$$

$$a4.1a1.2+a4.2a2.2+a4.3a3.2=\alpha4.2$$

$$a4.1a1.3+a4.2a2.3+a4.3a3.3=\alpha4.3$$

$$a5.1a1.1+a5.2a2.1+a5.3a3.1=\alpha5.1$$

$$a5.1a1.2+a5.2a2.2+a5.3a3.2=\alpha5.2$$

$$a5.1a1.3+a5.2a2.3+a5.3a3.3=\alpha5.3$$

$$a6.1a1.1+a6.2a2.1+a6.3a3.1=\alpha6.1$$

$$a6.1a1.2+a6.2a2.2+a6.3a3.2=\alpha6.2$$

$$a6.1a1.3+a6.2a2.3+a6.3a3.3=\alpha6.3$$

Therefore, <equation (5)> can be expressed with the following <equation (7)>.

$$\alpha 4.1x1+\alpha 4.2x2+\alpha 4.3x3=b4$$

$$\alpha 5.1x1+\alpha 5.2x2+\alpha 5.3x3=b5$$

$$\alpha 6.1x1+\alpha 6.2x2+\alpha 6.3x3=b6$$

Further, in order to prevent the same equation from existing upon encoding, first, a1.1, a1.2, . . . , a3.3 are randomly selected as expressed in <equation (8)> so that each equation is independent in <equation 1> and a solution can be obtained in simultaneous equations with three unknowns.

For example, it is assumed that the following <equation (8)> is selected.

$$(a1.1, a1.2, a1.3)=(8,3,4)$$

$$(a2.1, a2.2, a2.3)=(9,15,2)$$

$$(a3.1, a3.2, a3.3)=(13,6,5)$$

Then, in encoding in the second layer, in order to make equations in <equation (2) > including <equation (1) > independent, attention is focused on <equation (7)>, and $\alpha 4.1, \ldots, \alpha 6.3$ which become independent of each other are arbitrary selected.

For example, it is assumed that the following <equation (9)> is selected.

$$(\alpha 4.1, \alpha 4.2, \alpha 4.3)=(19,23,5)$$

$$(\alpha 5.1, \alpha 5.2, \alpha 5.3)=(8,41,6)$$

$$(\alpha 6.1, \alpha 6.2, \alpha 6.3)=(7,2,33)$$

If these equations (<equation (8)> and <equation (9)>) are substituted in <equation 6>, for example, the following <equation (10) > can be obtained.

$$8a4.1+9a4.2+13a4.3=19$$

$$3a4.1+15a4.2+6a4.3=23$$

$$4a4.1+2a4.2+5a4.3=5$$

A simultaneous equation with three unknowns is separately created for obtaining a4.1, . . . , a4.3, and a4.1, . . . , a4.3 and in <equation (2)> can be obtained by solving this simultaneous equation with three unknowns.

If the above is performed on a5.1, . . . , a5.3, a6.1, . . . , a6.3, . . . , in a similar manner, it is possible to obtain coefficients in relay encoding.

[Decoding]

In decoding, first, a server having a target file is searched for. If there are less than three servers having the file in search of the file, decoding fails.

If there are three or more servers, the client C selects arbitrary three servers among the servers, acquires header information including a list of coefficients in which all coefficients a are recorded from the three servers, and, then, downloads encoded data.

Then, x1, x2 and x3 are obtained using Gaussian elimination from the following simultaneous linear equations for each data bx compressed to 2 bytes, and these are connected to restore original data x1, x2 and x3 for each 6 bytes (see FIG. 4).

$$a1.1x1+a1.2x2+a1.3x3=b1$$

$$a2.1x1+a2.2x2+a2.3x3=b2$$

$$a3.1x1+a3.2x2+a3.3x3=b3$$

This work is performed until it reaches the end of the file, and decoding is completed by restoring data of the restored x1, x2 and x3 to three pieces of data of X1, X2 and X3, and combining these pieces of data to make the original file X0.

Also calculation in this decoding is performed using a Galois field (finite field) arithmetic library in a similar manner to encoding.

[File Management Using Consistent Hashing Method]

In the present example, the client can directly specify information such as which server has a target file using a consistent hashing method without using a special server which manages information, like a metadata server.

As an example, it is assumed that there exist four servers, and four files of "test.c", "Makefile", "Readme.txt" and "TODO".

Figure 6:
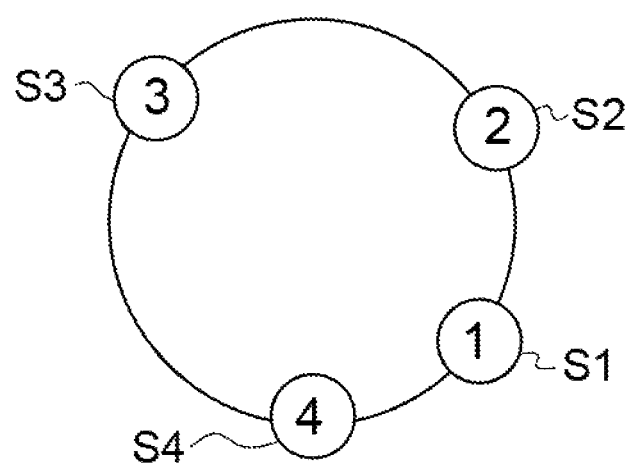
FIG. 6 is a pattern diagram illustrating an initial state of a hash ring.

In the present example, first, as can be seen in FIG. 6, servers are allocated on a ring using a hash value.

Figure 7:
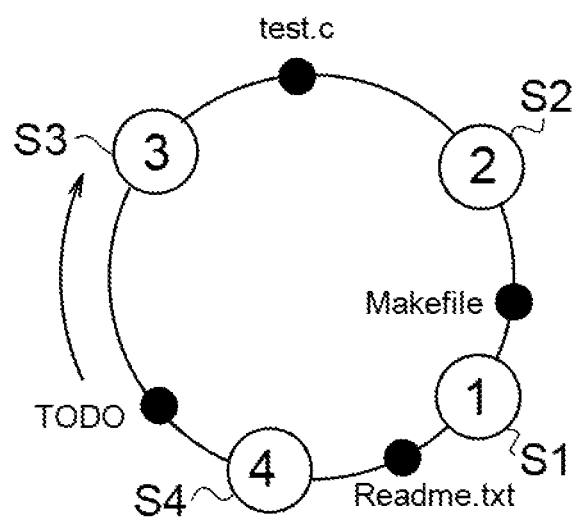
FIG. 7 is a pattern diagram illustrating a state before a server is added.

Then, as in FIG. 7, while the files are allocated on the ring in a similar manner, an owner of each file is a server the closest to a position of the file in a clockwise direction.

In FIG. 7, the server S3 owns the file TODO.

Figure 8:
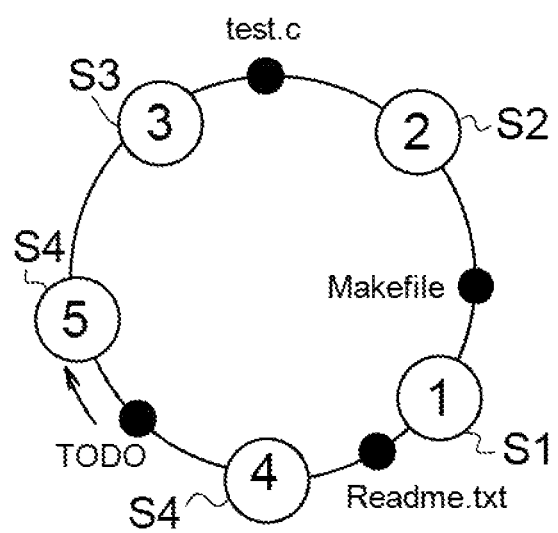
FIG. 8 is a pattern diagram illustrating a state after the server is added.
Figure 9:
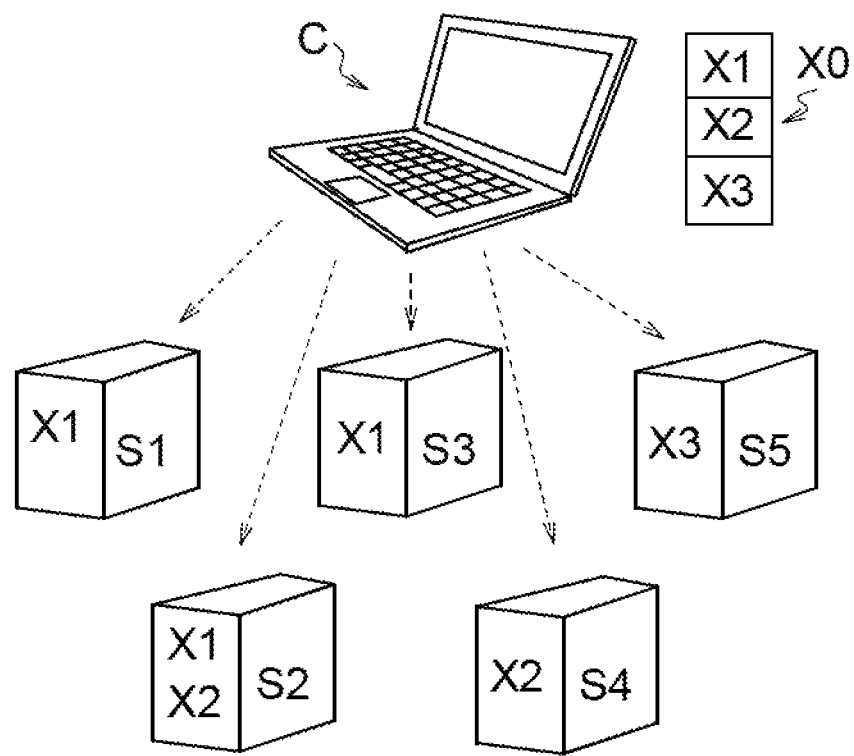
FIG. 9 is an explanatory diagram illustrating data distribution by conventional Hadoop.

In the present example, if, for example, as in FIG. 8, the server S5 is added, only the owner of the "TODO" file is changed, and a new owner of the "TODO" becomes the server S5. Because other files are not affected, change of servers having the files at that time can be made minimum.

In the present example, each of the servers S1, S2, S3, . . . , Sn holds a list of servers of host name of all the servers in each cluster.

When the client is connected to arbitrary one server, the client receives the list of servers.

The client C creates a hash ring as in FIG. 6 on the basis of the list and specifies which server has a target file as in FIG. 7 and FIG. 8.

In the present example, while at least three servers have to have the target files, if the specified server is S4, concerning other servers, it is regarded that the servers S5 and S6 which follow S4 on the list of servers have the target files.

A server program includes a program for communicating with a client program, and performing processing of transmission/reception, reading and storage of data, a program of executing encoding, decoding uploading to a server, downloading from a server of a file, and a program of enabling data stored in a server to be accessed from a local host as a file system.

Further, as a program comprised of JavaScript, a program of downloading encoded data from a server and, if the data is a moving image, reproducing data on a web browser while decoding the data is used.

By this means, in the case where the encoded data is moving image data, downloading is performed through HTTP using xMPHttpRequest functions, and a function of HTML5 can be used to reproduce a moving image, so that it is possible to reduce an amount of data storage in a cloud system or a network for video and music streaming service.

REFERENCE SIGNS LIST

1 distributed data system
2 coefficient determining unit
3 encoding unit
4 distribution storage unit
5 server selecting unit
6 decoding unit
7 remanufacturing unit S1, S2, S3 server
C client

What is claimed is:

1. A data processing system in which a client divides an original file into N different block files and distributes the block files to a number of servers of N or more in a distributed manner, the data processing system comprising:
   a coefficient determining unit configured to determine N different coefficients associated with the N block files as one set for each server;
   an encoding unit configured to encode the original file to a file of a 1/N size to make a file to be distributed to the servers by separating data of the original file into a number of pieces of data of the same size, separating each separated piece of data into N pieces of a size smaller than the size again, respectively multiplying N pieces of data which are separated again and which constitute N block files by the coefficients of the one set which are associated to obtain N products, and repeating processing of totaling the N products to compress the products into one piece of data;
   a decoding unit configured to solve a simultaneous linear equation formed with a set of N linear equations using N unknowns to restore the N block files, the simultaneous linear equation being generated by a computer using N files distributed to N servers and the coefficients determined for each of the N servers; and
   a file connecting unit configured to connect the restored N block files to remanufacture the original file,
   wherein the encoding unit connects the servers in a hierarchical manner, encoded data is directly distributed to N servers in an upper most layer in a distributed manner from the client, in servers other than the servers in the upper most layer, the encoded data is distributed to servers in a relatively lower layer from N servers in a relatively upper layer, and all servers except servers in the upper most layer and in a lower most layer sequentially perform encoding processing at the same time.

2. The data processing system according to claim 1, wherein N is 3, and the original file is comprised of block files of X1, X2 and X3,
   three pieces of data which are separated again are comprised of x1, x2 and x3, and
   $ak.1x1+ak.2x2+ak.3x3$ and $\forall k \in \{1, 2, 3, 4, \ldots\}$, where $ak.1$ is a coefficient of x1, $ak.2$ is a coefficient of x2 and $ak.3$ is a coefficient of x3 (where k is a number indicating a server), are obtained and compressed to one piece of data.

3. The data processing system according to claim 1, wherein calculation of encoding and decoding is performed using a Galois field (finite field).

4. A distributed data system in which a client divides an original file into N different block files and distributes the block files to a number of servers of N or more in a distributed manner, the distributed data system comprising:
   a coefficient determining unit configured to determine N different coefficients associated with the N block files as one set for each server and stores the coefficients;
   an encoding unit configured to encode the original file to a file of a 1/N size to make a file to be distributed to the servers by separating data of the original file into a number of pieces of data of the same size, separating each separated piece of data into N pieces of a size smaller than the size again, respectively multiplying N pieces of data which are separated again and which constitute N block files by the coefficients of the one set which are associated to obtain N products, and repeating processing of totaling the N products to compress the products into one piece of data;
   a distribution storage unit configured to distribute the encoded data to servers to which the data is to be distributed and store the encoded data in the servers;
   a server selecting unit configured to select arbitrary N servers from a number of servers,
   a decoding unit configured to generate a simultaneous linear equation formed with N linear equations using N unknowns, using N files distributed to the selected N servers and the coefficients determined for each of the N servers, and solve the simultaneous linear equation to restore the N block files; and
   a file connecting unit configured to connect the restored N block files to remanufacture the original file,
   wherein the encoding unit connects the servers in a hierarchical manner, encoded data is directly distributed to N servers in an upper most layer from the client in a distributed manner, in servers other than the servers in the upper most layer, encoded data is distributed from N servers in a relatively upper layer to servers in a relatively lower layer, all servers except servers in the upper most layer and in a lowermost layer sequentially perform encoding processing at the same time, and
   calculation at the encoding unit and the decoding unit is performed using a Galois field (finite field).

5. The distributed data system according to claim 4, wherein N is comprised of 2 or 3.

6. The distributed data system according to claim 4, wherein N is 3, and the original file is comprised of block files of X1, X2 and X3,
   three pieces of data which are separated again are comprised of x1, x2 and x3, and
   $ak.1x1+ak.2x2+ak.3x3$ and $\forall k \in \{1, 2, 3, 4, \ldots\}$, where $ak.1$ is a coefficient of x1, $ak.2$ is a coefficient of x2 and $ak.3$ is a coefficient of x3 (where k is a number indicating a server), are obtained and compressed to one piece of data.

* * * * *